(12) United States Patent
Ichikawa et al.

(10) Patent No.: US 9,348,156 B2
(45) Date of Patent: May 24, 2016

(54) OPTICAL WAVEGUIDE ELEMENT AND METHOD FOR MANUFACTURING OPTICAL WAVEGUIDE ELEMENT

(71) Applicant: Sumitomo Osaka Cement Co., Ltd., Chiyoda-ku, Tokyo (JP)

(72) Inventors: Junichiro Ichikawa, Tokyo (JP); Katsutoshi Kondou, Tokyo (JP)

(73) Assignee: SUMITOMO OSAKA CEMENT CO., LTD., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/768,699

(22) PCT Filed: Feb. 19, 2014

(86) PCT No.: PCT/JP2014/053943
§ 371 (c)(1),
(2) Date: Aug. 18, 2015

(87) PCT Pub. No.: WO2014/129508
PCT Pub. Date: Aug. 28, 2014

(65) Prior Publication Data
US 2016/0004105 A1    Jan. 7, 2016

(30) Foreign Application Priority Data
Feb. 21, 2013    (JP) ................. 2013-032058

(51) Int. Cl.
| | |
|---|---|
| G02B 6/10 | (2006.01) |
| G02F 1/035 | (2006.01) |
| G02B 6/134 | (2006.01) |
| G02B 6/126 | (2006.01) |
| G02F 1/355 | (2006.01) |
| G02B 6/12 | (2006.01) |

(52) U.S. Cl.
CPC ................ G02F 1/035 (2013.01); G02B 6/126 (2013.01); G02B 6/1342 (2013.01); G02F 1/3558 (2013.01); *G02B 2006/12097* (2013.01)

(58) Field of Classification Search
CPC ....... G02F 1/035; G02F 1/313; G02F 1/3558; G02B 6/126; G02B 6/1342; G02B 2006/12097; C30B 29/30
See application file for complete search history.

(56) References Cited

U.S. PATENT DOCUMENTS 5,519,802 A * 5/1996 Field ..................... G02F 1/3775
                                                             359/241
6,156,255 A   12/2000 Byer et al.
(Continued)

FOREIGN PATENT DOCUMENTS

JP     2010-078914     4/2010

OTHER PUBLICATIONS

D. Janner, D. Tulli, F. Lucchi, P. Vergani, S. Giurgola, V. Pruneri, "Grinding free electric-field poling of Ti indiffused z-cut LiNbO3 wafer with submicronresolution", 2008.5, p. 319-p. 321.

*Primary Examiner* — Ryan Lepisto
(74) *Attorney, Agent, or Firm* — Taft Stettinius & Hollister LLP

(57) ABSTRACT

A method according to an aspect of the present invention, is a method for manufacturing an optical waveguide element, including: an optical waveguide forming step of forming an optical waveguide extending in a first direction in a substrate by doping the substrate with an impurity for reducing a coercive electric field of the substrate, a ridge forming step of forming a first ridge part including the optical waveguide and a second ridge part intersecting the first ridge part, and a poling step of reversing a polarization direction of a region of the substrate divided by the second ridge part by applying voltage to the region.

6 Claims, 10 Drawing Sheets

(56) References Cited

U.S. PATENT DOCUMENTS

| | | |
|---|---|---|
| 6,356,673 B1 | 3/2002 | Burns |
| 6,867,901 B2 | 3/2005 | Sugiyama et al. |
| 7,689,067 B2 | 3/2010 | Ichikawa et al. |
| 8,050,524 B2 | 11/2011 | Shiraishi |
| 2006/0079006 A1* | 4/2006 | Yamamoto ............ G02F 1/3558 438/3 |
| 2014/0079351 A1 | 3/2014 | Macario et al. |

* cited by examiner

OPTICAL WAVEGUIDE ELEMENT AND METHOD FOR MANUFACTURING OPTICAL WAVEGUIDE ELEMENT

TECHNICAL FIELD

The present invention relates to an optical waveguide element and a method for manufacturing an optical waveguide element.

BACKGROUND ART

There is an optical waveguide element including a substrate that has an electro-optic effect and an optical waveguide provided in the substrate. For example, in optical modulation elements described in Patent Literature No. 1 and Non Patent Literature No. 1, the optical modulation bandwidth is expanded by polarization reversal of a part of the substrate provided with the optical waveguide. In addition, in an integrated optical modulation element described in Patent Literature No. 2, a high-accuracy optical signal with zero chirp and no skew is generated by reversing the polarization of apart of the substrate provided with the optical waveguide. Meanwhile, in order to reduce the drive voltage and expand the bandwidth, an optical modulation element whose waveguide is covered with a ridge waveguide structure is known and widely used.

CITATION LIST

Patent Literature

[Patent Literature No. 1] Japanese Laid-open Patent Publication No. 2005-284129
[Patent Literature No. 2] Japanese Laid-open Patent Publication No. 2008-116865
[Patent Literature No. 3] Japanese Laid-open Patent Publication No. 2005-275121

Non Patent Literature

[Non Patent Literature No. 1] Janner, Davide, Michele Belmonte, and Valerio Pruneri, "Tailoring the Electrooptic Response and Improving the Performance of Integrated LiNbO3 Modulators by Domain engineering." Journal of Lightwave Technology 25.9 (2007): 2402-2409
[Non Patent Literature No. 2] Schreiber, G., et al. "Efficient cascaded difference frequency conversion in periodically poled Ti: LiNbO3 waveguides using pulsed and cw pumping." Applied Physics B 73.5-6 (2001): 501-504
[Non Patent Literature No. 3] Janner, D., et al. "Grinding free electric-field poling of Ti in diffused z-cut LiNbO3 wafer with submicron resolution." Applied Physics A 91.2 (2008) 319-321
[Non Patent Literature No. 4] Shintaro MIYAZAWA and Sunao KURIMURA, Basics on the domain inversion devices and its application, The Optronics Co., Ltd. ISBN4-902312-11-5, 2005

SUMMARY OF INVENTION

Technical Problem

In order to solve the above-described two issues about the reducing of the drive voltage and the expansion of the bandwidth, an optical modulation element including both a polarization-reversal structure and a ridge structure can be considered. In order to produce the above-described optical modulation element, for example, in a substrate provided with a ridge part including an optical waveguide, it is necessary to reverse the ferroelectric polarization direction of a region where is not only the ridge part but also a flat part (the base of a trench part) except the ridge part. While it is possible to realize the efficacy of the Patent Literature No. 1 with a configuration in which only the polarization of the ridge like part is reversed, it is desirable to reverse the polarization of both the ridge part and the flat part (the base part in the trench) and form a ferroelectric polarization domain walls far apart from the ridge-like optical waveguide part. The reasons for what has been described above are as follows: the precise shape regulation as fine as the width of the ridge in the polarization reversal process is needed, a higher degree of sensitivity and accuracy is required for the monitoring a current for controlling reversed area by the monitoring as reversed area is small, the large stress and the high density of trapped charges in the polarization domain walls of ferroelectric crystals are likely to un-uniform the refractive index and results in the loss of the propagating light and the generation of an unwanted polarization component due to optical scattering, the degradation of the stability of an interferometer-type optical device is induced by the significantly distorted and the twist in optical waveguide substrate enhanced by temperature changes, and the like. In this case, since the thickness of the substrate varies in the ridge part and the flat part, the intensity of the electric field in the ridge part becomes smaller than the intensity of the electric field in the flat part when a high voltage is applied to the substrate in the polarization reversal process. Therefore, the adjustment of the voltage for polarization reversal becomes complicated and it is likely to cause the polarization direction to be reversed in an unintended region beyond a desired region. As a result, it is likely to degrade the width of the expanding bandwidth for optical control in the optical modulation element and the quality and accuracy of an optical signal.

Methods for the precise control of polarization reversal in the case of an optical waveguide having a flat structure instead of a ridge structure are described in Non Patent Literature Nos. 2 and 3. A method for removing a thin polarization-reversed layer formed in a diffusion process step of an impurity such as Ti through polishing or the like (Non Patent Literature No. 2) or the use of the conditions for the diffusion process step of an impurity in which no polarization-reversed layer is formed (Non Patent Literature No. 3) is effective and an example has been reported that a wall position of polarization-reversed domains is controlled with an accuracy of micrometers or less. Regarding the precise control of the polarization-reversed area in a substrate in which an optical waveguide is formed using the diffusion of an impurity such as Ti, it has not yet been scientifically concluded whether the presence of the thin polarization-reversed layer is an intrinsic hindering factor, not the presence of the thin polarization-reversed layer but the presence of the fine polarization-reversed area is a dominant hindering factor, or the reduction of the coercive electric field and the presence of the fine polarization-reversed domains in the impurity-diffused part are dominant hindering factors, however, it is true that the methods of Non Patent Literature Nos. 2 and 3 have moderate effectiveness for improving controllability.

However, in a case in which an optical waveguide having a ridge structure is formed, it is still difficult to correctly control the polarization-reversed domain even if the above-described methods are used. Patent Literature No. 3 discloses a method for controlling a polarization-reversed area by forming grooves, which are deeper than the height of a ridge part, on a plane opposite to a plane on which an optical waveguide is formed. The method is a brute-force solution in which a polarization-reversed area corresponding to the shape of the deep grooves formed on the back surface can be obtained regardless of the relatively small protrusion and recess structure on the plane and the non-uniformity in the thickness of the substrate as in a ridge-type waveguide. The method is extremely effective for fabricating a device having a configuration of Patent Literature No. 1 and a device having a configuration of Patent Literature No. 2, however, similar to Non Patent Literature No. 1, a working process for the substrate is required.

The present invention provides an optical waveguide element having a structure to be able to improve the accuracy for the polarization reversal process of a substrate and a method for manufacturing an optical waveguide element.

Solution to Problem

According to an aspect of the present invention, there is provided a method for manufacturing an optical waveguide element, including: an optical waveguide forming step of forming an optical waveguide that extends in a first direction in a substrate by doping the substrate with an impurity for reducing a coercive electric field of the substrate; a ridge forming step of forming a first ridge part that includes the optical waveguide and a second ridge part that intersects the first ridge part; and a poling step of reversing a polarization direction of a region of the substrate divided by the second ridge part by applying voltage to the region.

According to the method for manufacturing an optical waveguide element, an optical waveguide is formed by doping the substrate with an impurity for reducing the coercive electric field of the substrate and the first ridge part that includes the optical waveguide and the second ridge part that intersects the first ridge part are formed. In addition, in a case in which a high voltage is applied to carry out a polarization reversal process on a region of the substrate divided by the second ridge part, the electric field generated in a part except the first ridge part in the region becomes greater than the electric field generated in the second ridge part. Therefore, when the voltage is adjusted so that the coercive electric field of the substrate becomes greater than the electric field generated in the second ridge part and becomes smaller than the electric field generated in the part except the first ridge part in the region, the second ridge part can restrict a region in which the polarization direction is reversed and it becomes possible to prevent the polarization reversal of a part beyond the second ridge part. In addition, since the impurity for reducing the coercive electric field of the substrate is included in the first ridge part, it becomes possible to reverse the polarization direction of the first ridge part in the region. As a result, it becomes possible to improve the accuracy of the polarization reversal process of the substrate.

In the method for manufacturing an optical waveguide element according to the aspect of the present invention, in the ridge forming step, the second ridge part may be formed so that the height of the second ridge part becomes greater than the flatness of the substrate. The flatness of the substrate refers to the non-uniformity in the thickness of the substrate and is defined as a difference between the maximum value and the minimum value of the thickness of the substrate with reference to the back surface. In a case in which the flatness is greater than the height of the second ridge part, there is a possibility that a part having a height greater than the height of the second ridge part may be included in a region. When the voltage is increased in order to reverse the polarization direction of this part, the electric field in the second ridge part becomes great and it is likely to cause the polarization direction to be reversed beyond the second ridge part. Therefore, it becomes possible to enhance control reliability of polarization reversal using the second ridge part by setting the height of the second ridge part to become greater than the flatness of the substrate. As a result, it becomes possible to further improve the accuracy of a polarization reversal process.

In the method for manufacturing an optical waveguide element according to the aspect of the present invention, in the poling step, voltage may be applied to the region using a liquid electrode. In this case, it is possible to tightly bring the liquid electrode into contact with the substrate and it is possible to improve the uniformity of the voltage applied to the substrate. As a result, it becomes possible to further improve the accuracy of the polarization reversal process.

In the method for manufacturing an optical waveguide element according to the aspect of the present invention, in the ridge forming step, a third ridge part that intersects the first ridge part may be further formed, and in the poling step, the polarization direction of a region sandwiched by the second ridge part and the third ridge part in the substrate may be reversed by applying voltage to the region. According to what has been described above, in a case in which voltage is applied to the region sandwiched by the second ridge part and the third ridge part, the electric field generated in a part except the first ridge part in the sandwiched region becomes greater than the electric fields generated in the second ridge part and the third ridge part. Therefore, when the voltage is adjusted so that the coercive electric field of the substrate becomes greater than the electric fields generated in the second ridge part and the third ridge part and becomes smaller than the electric field generated in a part except the first ridge part in the sandwiched region, the second ridge part and the third ridge part can restrict a region in which the polarization direction is reversed and it becomes possible to prevent the polarization reversal of a part beyond the second ridge part and the third ridge part. In addition, since an impurity for reducing the coercive electric field of the substrate is included in the first ridge part, it becomes possible to reverse the polarization direction of the first ridge part in a region. As a result, it becomes possible to improve the accuracy of the polarization reversal process of the substrate.

According to another aspect of the present invention, there is provided an optical waveguide element, including: a substrate that includes a first ridge part extending in a first direction and a second ridge part intersecting the first ridge part. The first ridge part includes an optical waveguide that extends in the first direction. The optical waveguide includes an impurity for reducing the coercive electric field of the substrate. The substrate includes a first region and a second region disposed in line in the first direction. The polarization direction of the first region is opposite to the polarization direction of the second region. The second ridge part is provided on a boundary between the first region and the second region.

According to the optical waveguide element, the substrate includes the first ridge part extending in the first direction and the second ridge part intersecting the first ridge part and includes the first region and the second region disposed in line in the first direction. In a case in which voltage is applied to the second region in order to reverse the polarization direction of the second region, the electric field generated in a part except the first ridge part in the second region becomes greater than the electric field generated in the second ridge part. Therefore, when the voltage is adjusted so that the coercive electric field of the substrate becomes greater than the electric field generated in the second ridge part and becomes smaller than the electric field generated in a part except the first ridge part, the second ridge part can restrict the polarization reversal of the second region and it becomes possible to prevent the polarization reversal of a part beyond the second ridge part. In addition, since the first ridge part includes the optical waveguide including an impurity for reducing the coercive electric field of the substrate, it becomes possible to reverse the polarization direction of the first ridge part in the second region.

In the optical waveguide element according to the aspect of the present invention, the height of the second ridge part may be greater than the flatness of the substrate. In a case in which the flatness of the substrate is greater than the height of the second ridge part, there is a possibility that a part having a height greater than the height of the second ridge part may be included in the second region. When the voltage is increased in order to reverse the polarization direction of this part, the electric field in the second ridge part becomes great and it is likely to cause the polarization direction to be reversed beyond the second ridge part. Therefore, it becomes possible to enhance control reliability of polarization reversal using the second ridge part by setting the height of the second ridge part to become greater than the flatness of the substrate. As a result, it becomes possible to further improve the accuracy of the polarization reversal process.

In consideration of the power saving of a device which has been further emphasized in recent years, a ridge-type waveguide having a strong effect that reduces the drive voltage is particularly effective and this technology is highly valuable in the industrial aspect. In addition, in a case in which lithium niobate is used as a substrate, a ridge having a height in a range of approximately 5 μm to 5 μm is suitable and it is desirable to suppress non-uniformity in the thickness of the substrate to 5 μm or less and preferably 2 μm or less. The required uniformity in the thickness is stricter than the international standard of single crystals for SAW devices (Table 2 in Non Patent Literature No. 4), it is possible to procure a substrate having a non-uniformity of 2 μm or less, and the realization of this technology is successful.

Advantageous Effects of Invention

According to the present invention, it is possible to improve the accuracy of the polarization reversal process for substrates.

DESCRIPTION OF EMBODIMENTS

Hereinafter, embodiments of the present invention will be described in detail with reference to the accompanying drawing.

Figure 1:
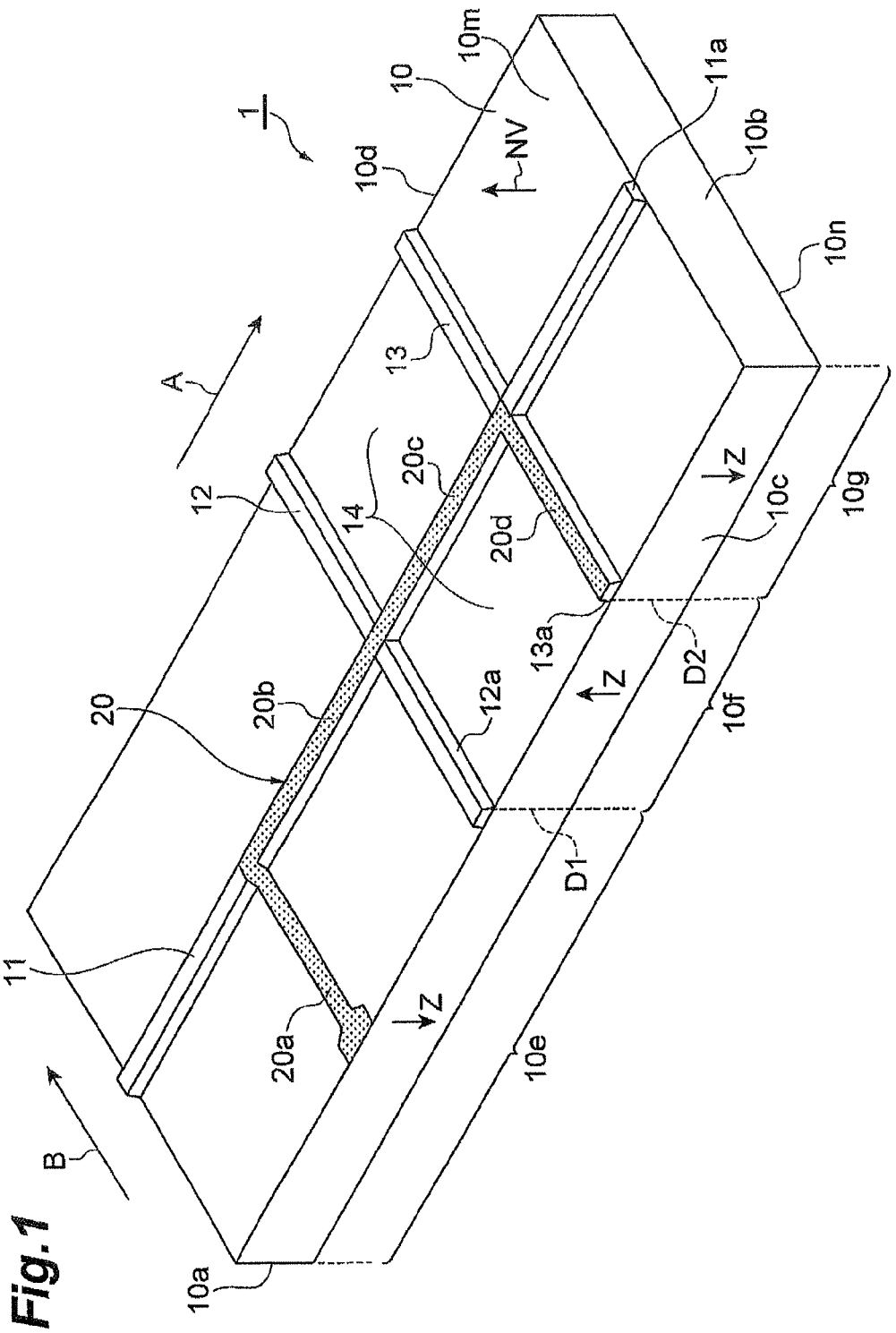
FIG. 1 is a perspective view schematically illustrating the configuration of an optical waveguide element according to an embodiment.

FIG. 1 is a view schematically illustrating the configuration of an optical waveguide element according to an embodiment. As illustrated in FIG. 1, an optical waveguide element 1 is, for example, an optical modulation element and includes a substrate 10 and a signal electrode 20.

The substrate 10 is a plate-like element extending in one direction (hereinafter, referred to as "the direction A (first direction)") and is made of a dielectric material (ferroelectric material) having an electro-optic effect, for example, lithium niobate ($LiNbO_3$, hereinafter, referred to as "LN"). The length of the substrate 10 in the direction A is, for example, in a range of approximately 10 mm to 150 mm. The length of the substrate 10 in a direction orthogonal to the direction A (hereinafter, referred to as "the direction B") is, for example, in a range of approximately 0.1 mm to 3 mm and the thickness of the substrate 10 is, for example, in a range of approximately 0.2 mm to 1 mm. The substrate 10 includes an end face 10a and an end face 10b, which are both edge faces in the direction A, and a side face 10c and a side face 10d, which are both side edge faces in the direction B.

The substrate 10 includes a first region 10e, a second region 10f, and a third region 10g. The first region 10e, the second region 10f, and the third region 10g are disposed in line in the direction A. In the first region 10e, the direction of a crystal axis Z of the dielectric material is, for example, opposite to the direction of a normal vector axis NV of a principal plane 10m of the substrate 10. In the second region 10f, the direction of the crystal axis Z of the dielectric material is, for example, identical to the direction of the normal vector axis NV of the principal plane 10m of the substrate 10. In the third region 10g, the direction of the crystal axis Z of the dielectric material is, for example, opposite to the direction of the normal vector axis NV of the principal plane 10m of the substrate 10. Here, the polarization direction of a dielectric material is identical to the direction of the crystal axis Z. That is, the polarization direction of the first region 10e is opposite to the polarization direction of the second region 10f and the polarization direction of the first region 10e is identical to the polarization direction of the third region 10g.

The substrate 10 includes a ridge part 11 (first ridge part), a ridge part 12 (second ridge part), a ridge part 13 (third ridge part), and a trench part 14. The ridge part 11 is provided on the principal plane 10m and extends in the direction A from the end face 10a to the end face 10b. The shape of the section orthogonal to the direction A of the ridge part 11 is a trapezoidal shape. The width of the top part of the ridge part 11 is, for example, approximately 9 μm. The width of the bottom part of the ridge part 11 is, for example, approximately 12 μm. The height of the ridge part 11 is, for example, approximately 6 μm. The thickness Tr1 of the substrate 10 at the ridge part 11 is, for example, approximately 1 mm. The ridge part 11 includes an optical waveguide 11a. The optical waveguide 11*a* is a linear optical waveguide and extends in the direction A from the end face 10*a* to the end face 10*b*. The optical waveguide 11*a* is made by doping the substrate 10 with an impurity such as titanium.

The ridge part 12 is provided on a domain wall D1 which is a boundary plane between the first region 10*e* and the second region 10*f* and extends in the direction B from the side face 10*c* to the side face 10*d*. The domain wall D1 is located at a side face 12*a* on the second region 10*f* side out of both side faces of the ridge part 12 and extends from the side face 12*a* to a back surface 10*n* of the substrate 10. The shape of the section orthogonal to the direction B of the ridge part 12 is a trapezoidal shape. The width of the top part of the ridge part 12 is, for example, in a range of approximately 9 µm to 20 µm. The width of the bottom part of the ridge part 12 is, for example, in a range of approximately 12 µm to 23 µm in a case in which the shape of the ridge is trapezoidal and the bottom corner angle is 75 degrees. The height of the ridge part 12 is, for example, approximately 6 µm. The thickness Tr2 of the substrate 10 at the ridge part 12 is, for example, approximately 1 mm.

The ridge part 13 is provided on a domain wall D2 which is a boundary plane between the second region 10*f* and the third region 10*g* and extends in the direction B from the side face 10*c* to the side face 10*d*. The domain wall D2 is located at a side face 13*a* on the second region 10*f* side out of both side faces of the ridge part 13 and extends from the side face 13*a* to the back surface 10*n* of the substrate 10. The shape of the section orthogonal to the direction B of the ridge part 13 is a trapezoidal shape. The width of the top part of the ridge part 13 is, for example, in a range of approximately 9 µm to 20 µm. The width of the bottom part of the ridge part 13 is, for example, in a range of approximately 12 µm to 23 µm in a case in which the shape of the ridge is trapezoidal and the bottom corner angle is 75 degrees. The height of the ridge part 13 is, for example, approximately 6 µm. The thickness Tr3 of the substrate 10 at the ridge part 13 is, for example, approximately 1 mm.

There are cases in which the thickness of a wafer before being worked is not uniform. In this case, the heights of the ridge part 12 and the ridge part 13 may be greater than the flatness (total thickness variation (TTV)) of the wafer. Here, the flatness of the wafer refers to the difference between the maximum value and the minimum value of the height throughout the whole wafer area measured in the thickness direction using the back surface of the wafer as the reference plane.

The trench part 14 is a part sandwiched by the ridge part 12 and the ridge part 13 and is separated by the ridge part 11 into a side face 10*c* side and a side face 10*d* side. The thickness Tt of the substrate 10 at the trench part 14 may be set to, for example, the thickness obtained by subtracting the height of the ridge part 12 from the thickness Tr2 of the substrate 10 in the ridge part 12.

The signal electrode 20 is a long element for transmitting a modulation signal which is an electrical signal supplied from the outside and applying an electric field corresponding to the modulation signal to the optical waveguide 11*a*. The signal electrode 20 is made of, for example, gold (Au). The signal electrode 20 includes a first part 20*a*, a second part 20*b*, a third part 20*c*, and a fourth part 20*d*.

The first part 20*a* is provided on the principal plane 10*m* in the first region 10*e* of the substrate 10. The first part 20*a* extends in the direction B from the side face 10*c* of the substrate 10 to the ridge part 11. One edge of the first part 20*a* is electrically connected to an external circuit for supplying the modulation signal. The second part 20*b* is provided on the ridge part 11 in the first region 10*e* and extends in the direction A from the other edge of the first part 20*a* to the domain wall D1. One edge of the second part 20*b* is connected to the other edge of the first part 20*a*.

The third part 20*c* is provided on the ridge part 11 in the second region 10*f* and extends in the direction A from the domain wall D1 to the domain wall D2. One edge of the third part 20*c* is connected to the other edge of the second part 20*b*. The second part 20*b* and the third part 20*c* function as an action part configured to apply an electric field formed by the modulation signal to the optical waveguide 11*a*. The fourth part 20*d* is provided on the ridge part 13 and extends in a direction opposite to the direction B from the other edge of the third part 20*c* to the side face 10*c*. One edge of the fourth part 20*d* is connected to the other edge of the third part 20*c* and the other edge of the fourth part 20*d* is electrically connected to a termination circuit.

The optical waveguide element 1 may further include a buffer layer (not illustrated). The buffer layer is provided on the substrate 10 and is disposed between the ridge part 11 and the signal electrode 20 in the ridge part 11. The buffer layer is provided to reduce the absorption of light propagating through the optical waveguide 11*a* by the signal electrode 20. The buffer layer is made of, for example, a silicon oxide (for example, $SiO_2$).

In the optical waveguide element 1 configured as described above, incident light is input to the optical waveguide 11*a* from the end face 10*a*. The incident light propagates through the optical waveguide 11*a*. At this time, when an electric field formed by the modulation signal transmitted by the signal electrode 20 is applied to the optical waveguide 11*a*, the refractive index of the optical waveguide 11*a* changes. The light propagating through the optical waveguide 11*a* is modulated with the change in the refractive index of the optical waveguide 11*a*. The light that has been modulated is output from the end face 10*b* as modulated light.

Here, the direction of the crystal axis Z of the dielectric material in the first region 10*e* is opposite to the direction of the normal vector axis NV of the principal plane 10*m* of the substrate 10. The direction of the crystal axis Z of the dielectric material in the second region 10*f* is identical to the direction of the normal vector axis NV of the principal plane 10*m* of the substrate 10. Therefore, in the first region 10*e*, the amount of an induced phase in a lower frequency increases in proportion to the length of the second part 20*b* and the amount of an induced phase in a higher frequency gently increases as the length of the second part 20*b* increases. Meanwhile, in the second region 10*f*, the amounts of an induced phase in a lower frequency and in a higher frequency are identical to the amounts of an induced phase in a lower frequency and in a higher frequency in the first region 10*e* respectively, but the directions of the changes of the amounts of an induced phase in a lower frequency and in a higher frequency are opposite to the directions of the changes of the amounts of an induced phase in a lower frequency and in a higher frequency in the first region 10*e*. That is, in the second region 10*f*, the amount of an induced phase in a lower frequency decreases in proportion to the length of the third part 20*c* and the amount of an induced phase in a higher frequency gently decreases as the length of the third part 20*c* increases. Therefore, the difference between the amount of an induced phase in a lower frequency and the amount of an induced phase in a higher frequency is reduced and the optical frequency response characteristics are flattened. As a result, it becomes possible to expand the bandwidth.

Figure 2:
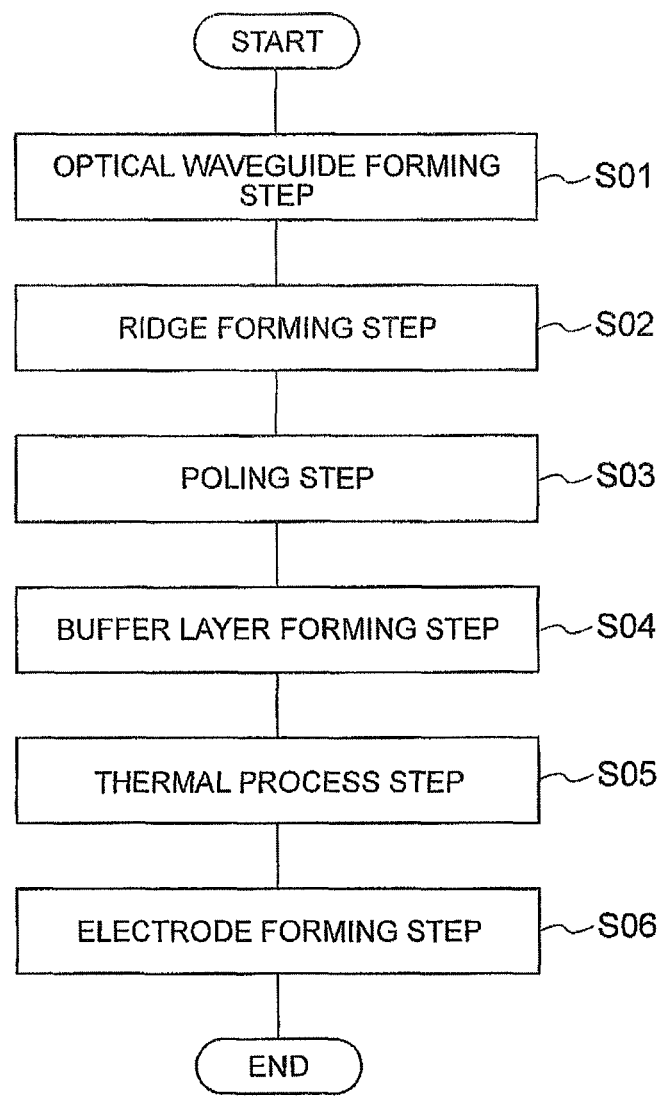
FIG. 2 is a flowchart illustrating an example of a method for manufacturing the optical waveguide element of FIG. 1.

Next, an example of a method for manufacturing the optical waveguide element 1 will be described with reference to FIGS. 1 and 2. FIG. 2 is a flowchart illustrating an example of a method for manufacturing the optical waveguide element 1. As illustrated in FIG. 2, the method for manufacturing the optical waveguide element 1 includes an optical waveguide forming step S01, a ridge forming step S02, a poling step S03, a buffer layer forming step S04, a thermal process step S05, and an electrode forming step S06.

In the optical waveguide forming step S01, the optical waveguide 11a is formed on the principal plane 10m of the substrate 10 (wafer). For example, on the principal plane 10m of the substrate 10, when the part in which the optical waveguide 11a is formed is doped with an impurity, the optical waveguide 11a is formed. For example, when an impurity is deposited onto the part in which the optical waveguide 11a is formed and the deposited impurity is thermally diffused, the part is doped with the impurity. The doping impurity needs to be an impurity for reducing the coercive electric field Ec (also referred to as the switching fields required for 180° domain reversal) of the dielectric material included in the substrate 10 and examples thereof include titanium (Ti), copper (Cu), chromium (Cr), and the like. The coercive electric field Ec refers to an electric field in which the polarization direction of the spontaneous polarization of a dielectric material is reversed. For example, the coercive electric field Ec of an LN crystal which is commercially available for the use of an optical waveguide is approximately 21 kV/mm, but the coercive electric field Ect of an LN crystal doped with titanium is smaller than the coercive electric field Ec of the LN crystal and the doped crystal is thus easily reversed.

In the ridge forming step S02, the ridge part 11, the ridge part 12, and the ridge part 13 are formed on the principal plane 10m of the substrate 10 on which the optical waveguide 11a is formed in the optical waveguide forming step S01. Specifically, in the ridge forming step S02, first, a mask M is formed by, for example, photolithography so as to cover the regions on the principal plane 10m corresponding to the ridge part 11, the ridge part 12, and the ridge part 13.

Figure 3:
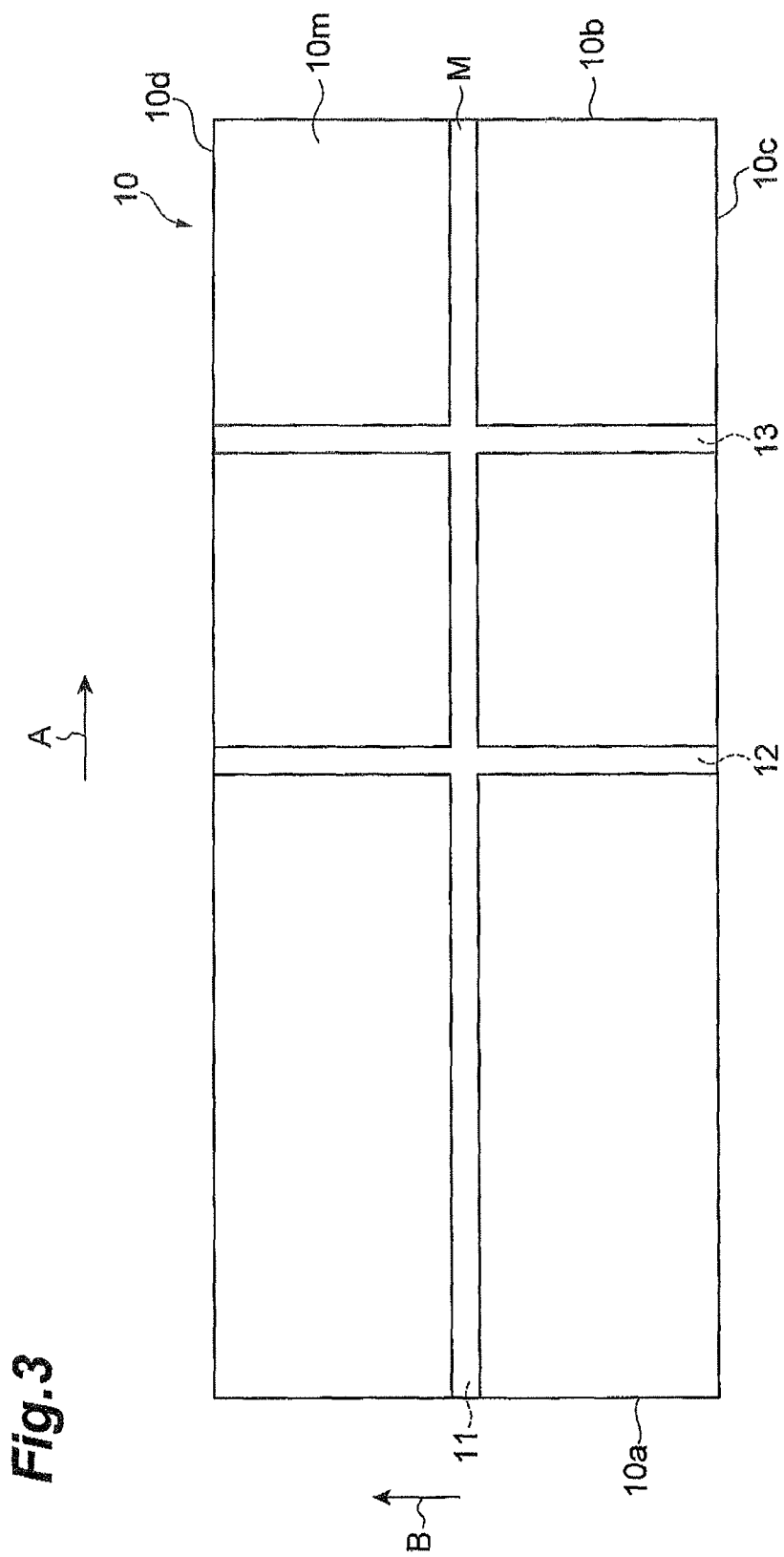
FIG. 3 is a plan view schematically illustrating the configuration of a substrate in a ridge forming step in FIG. 2.

FIG. 3 is a plan view schematically illustrating the configuration of the substrate 10 on which the mask M is formed in the ridge forming step S02. As illustrated in FIG. 3, the mask M is formed on the principal plane 10m of the substrate 10 so as to cover the regions on which the ridge part 11, the ridge part 12, and the ridge part 13 are formed. In addition, the ridge part 11, the ridge part 12, and the ridge part 13 are formed by chemically removing the principal plane 10m of the substrate 10 through dry etching, wet etching, or the like using the mask M as an etching mask. The ridge part 11, the ridge part 12, and the ridge part 13 may be formed by mechanically removing the principal plane 10m of the substrate 10 through sand blasting, cutting, or the like. After the ridge part 11, the ridge part 12, and the ridge part 13 are formed, the mask M is removed.

Figure 4:
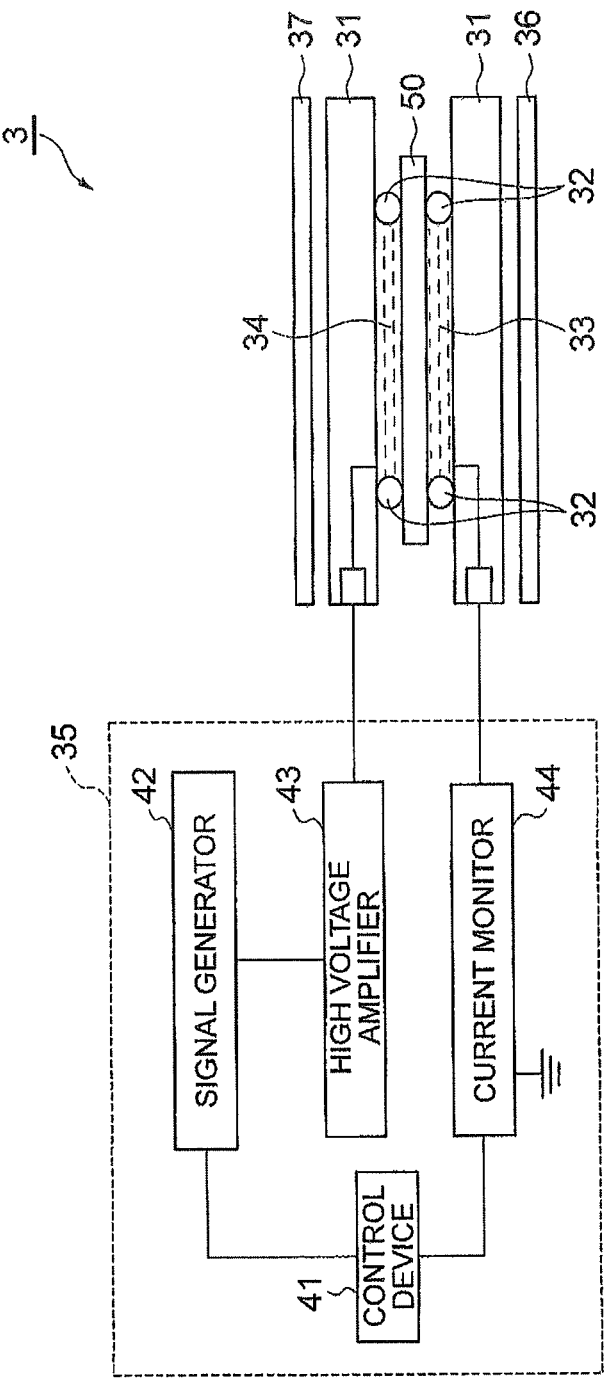
FIG. 4 is a view schematically illustrating the configuration of a polarization reversal process apparatus used in a poling step in FIG. 2.

In the poling step S03, the polarization direction of a desired region in the substrate 10 is reversed using the polarization reversal process apparatus 3. As illustrated in FIG. 4, the polarization reversal process apparatus 3 includes holding parts 31, sealing parts 32, a liquid electrode 33, a liquid electrode 34, a high voltage power supply 35, a polarizer 36, and an analyzer 37. The holding parts 31 are a pair of plate-like parts for sandwiching a substrate 50 and are, for example, a transparent resin plate such as an acrylic plate. The sealing part 32 is, for example, a ring-shaped resin material (O ring). The liquid electrode 33 and the liquid electrode 34 are conductive liquids and are, for example, aqueous solutions of lithium chloride (LiCl). The polarizer 36 and the analyzer 37 are polarization plates for observing crossed Nichol images.

The high voltage power supply 35 is an apparatus for supplying a high voltage. The high voltage power supply 35 includes a control device 41, a signal generator 42, a high voltage amplifier 43, and a current monitor 44. The control device 41 is, for example, a personal computer (PC) and configured to transmit a control signal to the signal generator 42 depending on the current monitored by the current monitor 44. The signal generator 42 is, for example, a pulse generator and configured to output a pulse signal having a voltage of several volts depending on the control signal output from the control device 41. The high voltage amplifier 43 is a circuit configured to amplify the voltage and amplify the voltage of the pulse signal output from the signal generator 42. The high voltage amplifier 43 is configured to output the amplified pulse signal to the liquid electrode 34 and apply a high voltage V between the liquid electrode 33 and the liquid electrode 34. The current monitor 44 is configured to monitor a current flowing in the substrate 10.

In the polarization reversal process apparatus 3 configured as described above, the substrate 50 is sandwiched by the pair of holding parts 31 through the sealing parts 32, the gap between one face of the substrate 50 and the holding part 31 is filled with the liquid electrode 33, and the gap between the other face of the substrate 50 and the holding part 31 is filled with the liquid electrode 34. In addition, the high voltage power supply 35 generates a signal from the signal generator 42 on the basis of the control signal from the control device 41 and applies a high voltage V between the liquid electrode 33 and the liquid electrode 34 through the high voltage amplifier 43. In addition, the control device 41 stops the output of the signal by the signal generator 42 in a case in which the amount of charges obtained by timely integrating the current monitored by the current monitor 44 is detected to reach a value determined according to the area of a region to be reversed. The substrate 50 sandwiched by the holding parts 31 is the substrate 10 masked for applying an electric field exceeding the coercive electric field Ec to the desired region.

Figure 5:
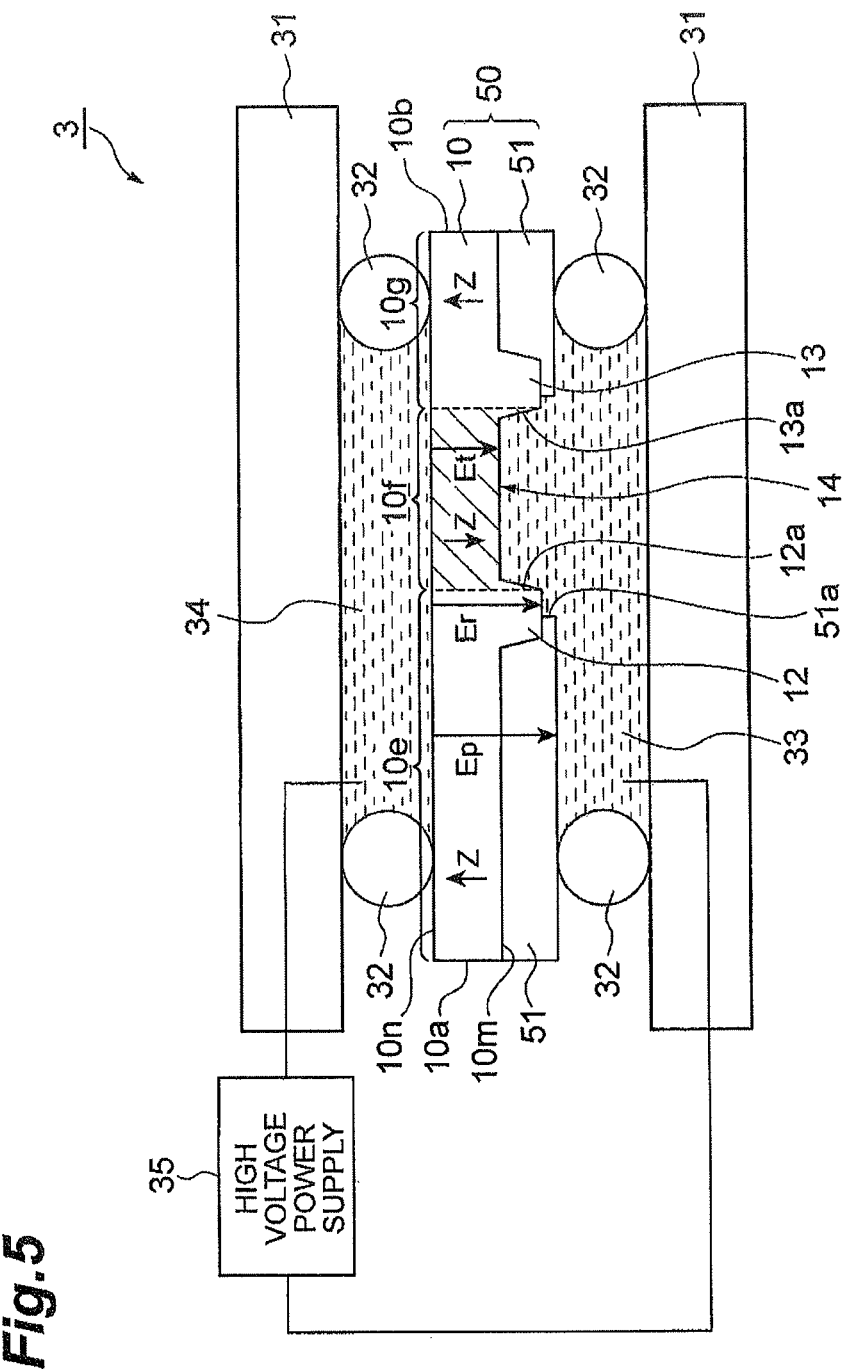
FIG. 5 is a view schematically illustrating an example of a masking method of a substrate in the polarization reversal process apparatus of FIG. 4.

FIG. 5 is a view schematically illustrating an example of a masking method of the substrate 10 in the polarization reversal process apparatus 3. As illustrated in FIG. 5, the substrate 50 includes the substrate 10 and a mask layer 51 provided on the principal plane 10m of the substrate 10. The mask layer 51 is insulative and is made of, for example, an insulating resin. The mask layer 51 is provided on the principal plane 10m so as to cover a part from the end face 10a of the substrate 10 to the top face of the ridge part 12 and a part from the end face 10b to the top face of the ridge part 13. The mask layer 51 has an aperture 51a on a part sandwiched by the top face of the ridge part 12 and the top face of the ridge part 13 in the principal plane 10m. The mask layer 51 can be formed through, for example, spin coating or photolithography.

The principle of the polarization reversal using the polarization reversal process apparatus 3 will be described. The thickness Tr1, the thickness Tr2, and the thickness Tr3 will all be described as the thickness Tr. In the polarization reversal process apparatus 3, the voltage V is supplied between the liquid electrode 33 and the liquid electrode 34. At this time, the voltage V is applied to the substrate 10 through the aperture 51a in the mask layer 51. The electric fields Er in the ridge part 12 and the ridge part 13 are values (V/Tr) obtained by dividing the voltage V by the thicknesses Tr of the substrate 10 at the ridge part 12 and the ridge part 13. In addition, the electric field Et in the trench part 14 is a value (V/Tt) obtained by dividing the voltage V by the thickness Tt of the substrate 10 at the trench part 14.

In addition, the voltage V is adjusted so that the coercive electric field Ec of the substrate 10 reaches somewhere between the electric field Er and the electric field Et (Er<Ec<Et). The electric field in the ridge part 11 becomes equal to the electric field Er on average. However, since the ridge part 11 is doped with an impurity such as titanium, the coercive electric field Ect in the ridge part 11 is smaller than the coercive electric field Ec. Therefore, polarization reversal using the electric field Er becomes possible. In addition, the electric field Ep at a position provided with the mask layer 51 is smaller than the electric field Er. Therefore, the polarization direction in a region sandwiched by the ridge part 12 and the ridge part 13 in the substrate 10 is reversed and the second region 10$f$ is formed.

Back to FIG. 2, in the buffer layer forming step S04, after the ridge part 11, the ridge part 12, and the ridge part 13 are formed on the principal plane 10$m$ of the substrate 10, a buffer layer is formed on the principal plane 10$m$ of the substrate 10 so as to cover the optical waveguide 11$a$. The buffer layer may be formed on the principal plane 10$m$ of the substrate 10 so as to cover the whole principal plane 10$m$. The buffer layer is formed using a generic thin film deposition method such as a vacuum deposition method, an ion assist vacuum deposition method, a sputtering method, or a chemical vapor deposition (CVD) method. The buffer layer is made of, for example, a silicon oxide ($SiO_2$), aluminum oxide ($Al_2O_3$), or the like.

In the thermal process step S05, a thermal process is carried out on the buffer layer in order to fill up the oxygen deficiency of the buffer layer formed in the buffer layer forming step S04. This thermal process is carried out in an oxygen-containing atmosphere at a temperature of approximately 600° C.

In the electrode forming step S06, the signal electrode 20 is formed on the buffer layer. Specifically, a resist pattern is formed on the buffer layer through photolithography. This resist pattern has an aperture for the signal electrode 20. Next, the signal electrode 20 is formed on the buffer layer using the resist pattern as a mask through, for example, a plating method. In the electrode forming step S06, a ground electrode may be formed on the buffer layer. After the formation of the signal electrode 20, the resist pattern is removed.

The optical waveguide element 1 is produced as described above. The buffer layer forming step S04 and the thermal process step S05 may be carried out between the ridge forming step S02 and the poling step S03 or may not be carried out in a case in which the buffer layer is not provided.

According to the above-described method for manufacturing the optical waveguide element 1, the optical waveguide 11$a$ extending in the direction A is formed by doping the substrate 10 with an impurity for reducing the coercive electric field Ec of the substrate 10 and the ridge part 11 which includes the optical waveguide 11$a$ and extends in the direction A and the ridge part 12 and the ridge part 13 which intersect the ridge part 11 are formed. In addition, the voltage V is applied to the region sandwiched by the ridge part 12 and the ridge part 13 (one region segmented by the ridge part 12) in the substrate 10. At this time, the electric field Et generated in the trench part 14 becomes greater than the electric fields Er generated in the ridge part 12 and the ridge part 13. Therefore, when the voltage V is adjusted so that the coercive electric field Ec of the substrate 10 becomes greater than the electric fields Er generated in the ridge part 12 and the ridge part 13 and becomes smaller than the electric field Et generated in the trench part 14, the ridge part 12 and the ridge part 13 can restrict the broadening of the second region 10$f$ in which the polarization direction is reversed.

That is, the second region 10$f$ broadens up to the side face 12$a$ of the ridge part 12 in the opposite direction against the direction A, but is not formed beyond the ridge part 12. In addition, the second region 10$f$ broadens up to the side face 13$a$ of the ridge part 13 in the direction A, but is not formed beyond the ridge part 13. As described above, it is possible to prevent polarization reversal from occurring beyond the ridge part 12 and the ridge part 13. In addition, since the impurity for reducing the coercive electric field Ec of the substrate 10 is included in the ridge part 11, it becomes possible to reverse the polarization direction of the ridge part 11 sandwiched by the ridge part 12 and the ridge part 13. As a result, it becomes possible to improve the accuracy of the polarization reversal process of the substrate 10.

Fundamentally, in the ridge part 11 or in the position which is opposite to the ridge part 11 in the back surface of the substrate, nuclei of reversed polarization are not generated, and the nuclei will not penetrate through the substrate 10 and the polarization-reversed domain will not grow, since the electric field Er in the ridge part 11 does not exceed the coercive electric field Ec of the substrate. However, in the ridge part in which the impurity such as Ti is diffused, if the polarization reversal process is carried out under the above-described conditions, the polarization direction of the diffused ridge part is reversed to be merged with the reversed polarization part of the trench part 14. On the other hand, in the ridge part 12 and the ridge part 13 in which no impurity is diffused, it is observed reproducibly that the polarization direction is not reversed as long as the electric field Er does not exceed the coercive electric field Ec of the substrate.

Under conditions in which the polarization of the ridge part 11 is stably reversed with excellent reproducibility, it can be assumed that the following phenomena occur. A number of fine nuclei of reversed polarization are generated on the surface of the ridge part 11 to which an electric field close to the coercive electric field Ec is applied. Since the coercive electric field of the part including the impurity is smaller than the intrinsic coercive electric field Ec of the substrate material, the fine nuclei of reversed polarization are capable of growing up to approximately the same depth as the diffusion distance of Ti, which is the impurity, (in the case of an optical waveguide at the wavelength, 1550 nm, for widely used fiber optic communication, the depth is in a range of 3 µm to 4 µm), but are not capable of growing up to penetrate through the substrate 10. Meanwhile, in the trench part 14, since the electric field Et exceeds the coercive electric field Ec, nuclei of reversed polarization are generated at multiple sites and the growth of the polarization reversed domain and the expansion of the area of the polarization reversed part proceed by way of being penetrated through the substrate. It can be considered that the generation of new nuclei of reversed polarization and the expansion of the polarization reversed domain through penetration will be stopped or significantly suppressed after the wall of polarization-reversed domain reaches the slope face of the ridge part 11. However, since movement of the wall of the polarization-reversed domain would be possible to occur even if the electric field Et is equal to or smaller than the coercive electric field Ec, the coalescing (merging) of the polarization reversed domains that has grown up to approximately several micrometers in the ridge part 11 and the polarization-reversed domains that have grown and expanded in the trench part 14 would be possible to occur. Furthermore, when the generation of new nuclei of reversed polarization in the ridge part 11, the growth of the nuclei of reversed polarization to approximately several micrometers, and the merging are repeated, the expansion of the area of the reversed polarization part that has grown and expanded in the trench part 14 continues and, finally, a merged polarization-reversed domain including the whole ridge part 11 is formed. The formation of fine nuclei of reversed polarization and the movement of the walls of polarization-reversed domain even if the electric field is equal to or smaller than the coercive electric field are reported in Section 3.1.4 "selective nucleation" in Non Patent Literature No. 4.

Even in the ridge part 12 and the ridge part 13 in which no impurity is diffused, it is considered that fine nuclei of reversed polarization are formed on the surfaces and the wall of polarization-reversed domain and the fine nuclei move. Therefore, in the ridge parts 12 and 13 as well, it is considered that, albeit slowly, polarization reversal proceeds. However, since the polarization-reversed domains formed in the ridge parts 12 and 13 are extremely small, the growth toward the ridge parts 12 and 13 in the polarization-reversed part that has grown and expanded in the trench part 14 is extremely slow compared with the growth toward the ridge part 11. Therefore, there are no issues in the view of actual process control even if the expansion of the reversed domain toward the ridge parts 12 and 13 is considered to not proceed.

In addition, the voltage V is applied to the region sandwiched by the ridge part 12 and the ridge part 13 using the liquid electrodes 33 and 34. Therefore, it is possible to surely bring the liquid electrodes 33 and 34 into contact with the substrate 10 and to improve the uniformity of the voltage applied to the substrate 10. As a result, it becomes possible to further improve the accuracy of the polarization reversal process.

The optical waveguide element and the method for manufacturing the optical waveguide element according to an aspect of the present invention are not limited to the above-described embodiments. For example, the optical waveguide element 1 is not limited to the optical modulation element and may be an optical switch, a polarization controller, or the like. In this case, the ridge part 12 and the ridge part 13 may be appropriately changed depending on the shape which forms polarization reversal. In the case of an optical switch configured to switch the optical path of propagating light and a Mach-Zehnder optical modulator or the like configured to multiplex and interfere with two light waves, it is not possible to configure the optical waveguide element with only linear elements and slanting or bended optical waveguide parts are required; however, in a case in which the slanting or bended part forms a ridge optical waveguide, for example, the ridge part 12 and the ridge part 13 may not be perpendicular to the direction A and may be slanted. In addition, in a case in which the region in which polarization is reversed does not include the end face 10a, the end face 10b, the side face 10c, and the side face 10d, that is, the region is confined in the substrate 10, the ridge parts may be provided so as to surround the region in which polarization is reversed. In addition, in the configuration in which the optical waveguide element 1 includes multiple optical waveguides extending in the direction A, it is also possible to provide a ridge part that intersects the direction B and divides regions so that the polarization directions differ between the optical waveguides.

In addition, the optical waveguide 11a may be a Mach-Zehnder-type optical waveguide and may have a structure suitable for the modulation method of the optical waveguide element 1.

The substrate 10 may include the first region 10e and the second region 10f and may not include the third region 10g. In this case, the optical waveguide element 1 may not include the ridge part 13. As described above, the substrate 10 may include two or more regions arranged in line in the direction A and the number of the regions is not limited. In addition, the polarization directions of adjacent regions may be opposite to each other and the substrate 10 may include a ridge part provided on a domain wall (boundary plane) between the adjacent regions.

In addition, in the ridge forming step S02, it is also possible to measure the flatness of the substrate 10 on which the optical waveguide 11a is formed and to form the ridge part 12 and the ridge part 13 so that the heights of the ridge part 12 and the ridge part 13 become greater than the flatness of the substrate 10.

Figure 6:
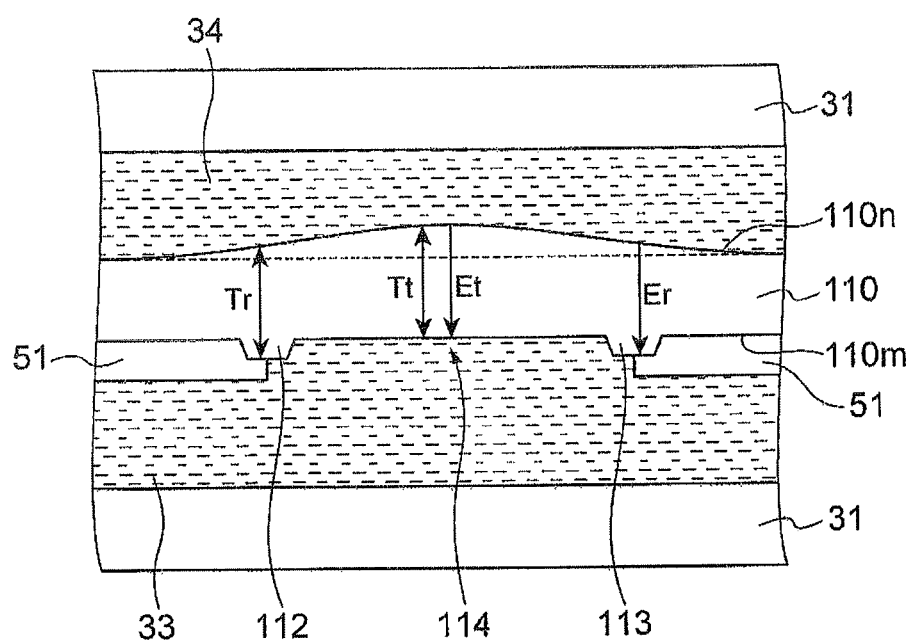
FIG. 6 is an enlarged view schematically illustrating a periphery of a trench part in a substrate of a comparative example.

The influence of the flatness of the substrate on polarization reversal will be described using FIG. 6. FIG. 6 is an enlarged view schematically illustrating the periphery of the trench part in a substrate of a comparative example. As illustrated in FIG. 6, in a substrate 110 of a comparative example, the back surface 110n is swollen and the heights of a ridge part 112 and a ridge part 113 are smaller than the flatness of the substrate 110. That is, the thickness Tt of the substrate 110 at a trench part 114 is greater than the thicknesses Tr of the substrate 110 at the ridge part 112 and the ridge part 113. Here, in order to reverse the polarization direction of the trench part 114, the electric field Et(=V/Tt) of the trench part 114 is set to become greater than the coercive electric field Ec of the substrate 110 by increasing the voltage V. In the substrate 110 of the comparative example, since the thickness Tt of the substrate 110 at the trench part 114 is greater than the thicknesses Tr of the substrate 110 at the ridge part 112 and the ridge part 113, the electric fields Er(=V/Tr) at the ridge part 112 and the ridge part 113 become greater than the coercive electric field Ec of the substrate 110. Therefore, the polarization directions of the ridge part 112 and the ridge part 113 are reversed and, furthermore, it is likely to cause the polarization to be reversed beyond the ridge part 112 and the ridge part 113.

On the contrary, as illustrated in FIG. 5, in the substrate 10, the heights of the ridge part 12 and the ridge part 13 are greater than the flatness of the substrate 10. That is, the thicknesses Tr of the substrate 10 at the ridge part 12 and the ridge part 13 are greater than the thickness Tt of the substrate 10 at the trench part 14. Here, in order to reverse the polarization direction of the trench part 14, the electric field Et of the trench part 14 is set to become greater than the coercive electric field Ec of the substrate 10 by increasing the voltage V. In this case, in the substrate 10, since the thicknesses Tr of the substrate 10 at the ridge part 12 and the ridge part 13 are greater than the thickness Tt of the substrate 10 at the trench part 14, it is possible to adjust the voltage V so that the coercive electric fields Ec of the substrate 10 reaches somewhere between the electric field Er and the electric field Et (Er<Ec<Et). Therefore, the ridge part 12 and the ridge part 13 can restrict the range of the substrate 10 in which polarization is reversed. As described above, in the substrate 10, it becomes possible to enhance control reliability of polarization reversal using the ridge part 12 and the ridge part 13. As a result, it becomes possible to further improve the accuracy of the polarization reversal process.

In addition, the masking method of the substrate 10 in the polarization reversal process apparatus 3 is not limited to the above-described method. Hereinafter, modification examples of the masking method of the substrate 10 will be described.

First Modification Example

Figure 7:
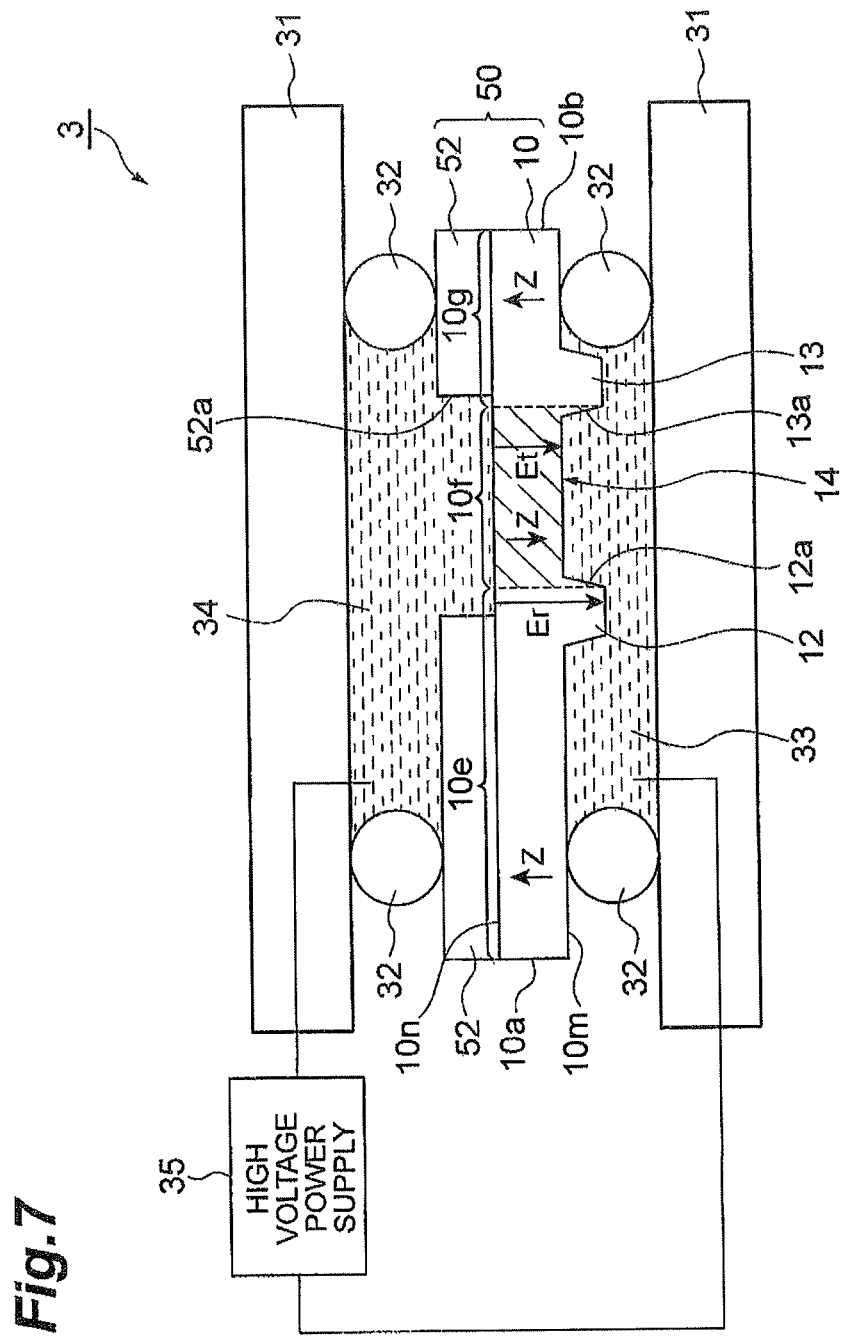
FIG. 7 is a view schematically illustrating a first modification example of the masking method of the substrate in the polarization reversal process apparatus of FIG. 4.

FIG. 7 is a view schematically illustrating a first modification example of the masking method of the substrate 10 in the polarization reversal process apparatus 3. As illustrated in FIG. 7, the substrate 50 is different from the substrate 50 in FIG. 5 in that the substrate 50 includes a mask layer 52 in place of the mask layer 51. That is, in the substrate 50 in FIG. 7, the mask layer 52 is provided on the back surface 10n so as to cover, in the back surface 10n of the substrate 10, a part from the end face 10a of the substrate 10 to a position which is opposite to the ridge part 12 and a part from the end face 10b to a position which is opposite to the ridge part 13. The mask layer 52 has an aperture 52a on a part sandwiched by the position which is opposite to the ridge part 12 and the position which is opposite to the ridge part 13 in the back surface 10n. The mask layer 52 has insulation property and is made of, for example, an insulating resin. The mask layer 52 can be formed by, for example, spin coating or photolithography.

In this polarization reversal process apparatus 3 as well, similar to the polarization reversal process apparatus 3 in FIG. 5, it is possible to reverse the polarization direction of a desired region in the substrate 10. In addition, since the insulating resin (mask layer 52) formed by photolithography or the like is not deformed by the ridge part 11, the ridge part 12, and the ridge part 13, it is possible to sharply form boundaries (the domain wall D1 and the domain wall D2) of polarization reversal with excellent accuracy.

Second Modification Example

Figure 8:
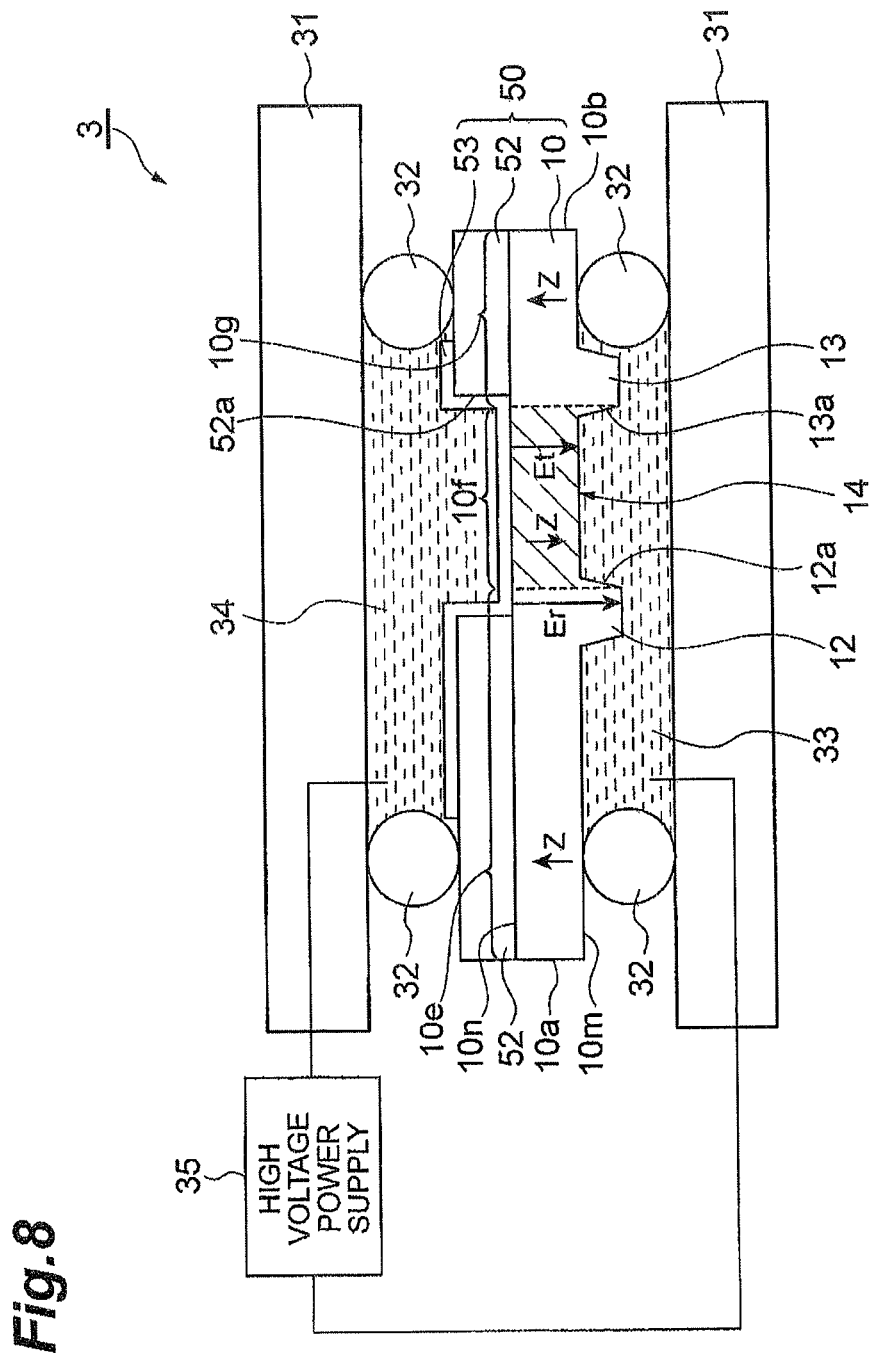
FIG. 8 is a view schematically illustrating a second modification example of the masking method of the substrate in the polarization reversal process apparatus of FIG. 4.

FIG. 8 is a view schematically illustrating a second modification example of the masking method of the substrate 10 in the polarization reversal process apparatus 3. As illustrated in FIG. 8, the substrate 50 is different from the substrate 50 in FIG. 7 in that a metal film 53 is further provided. That is, in the substrate 50 in FIG. 8, the metal film 53 is provided on the mask layer 52 in a range surrounded by the sealing parts 32. The metal film 53 is provided on the back surface 10n of the substrate 10 in the aperture 52a and is in contact with the substrate 10. The metal film 53 is conductive and is made of, for example, chromium (Cr), aluminum (Al), gold (Au), or the like. The metal film 53 can be formed using, for example, a liftoff method.

In this polarization reversal process apparatus 3 as well, similar to the polarization reversal process apparatus 3 in FIG. 5, it is possible to reverse the polarization direction of a desired region in the substrate 10. In addition, it is possible to improve the uniformity of the electric field being applied using the metal film 53.

Third Modification Example

Figure 9:
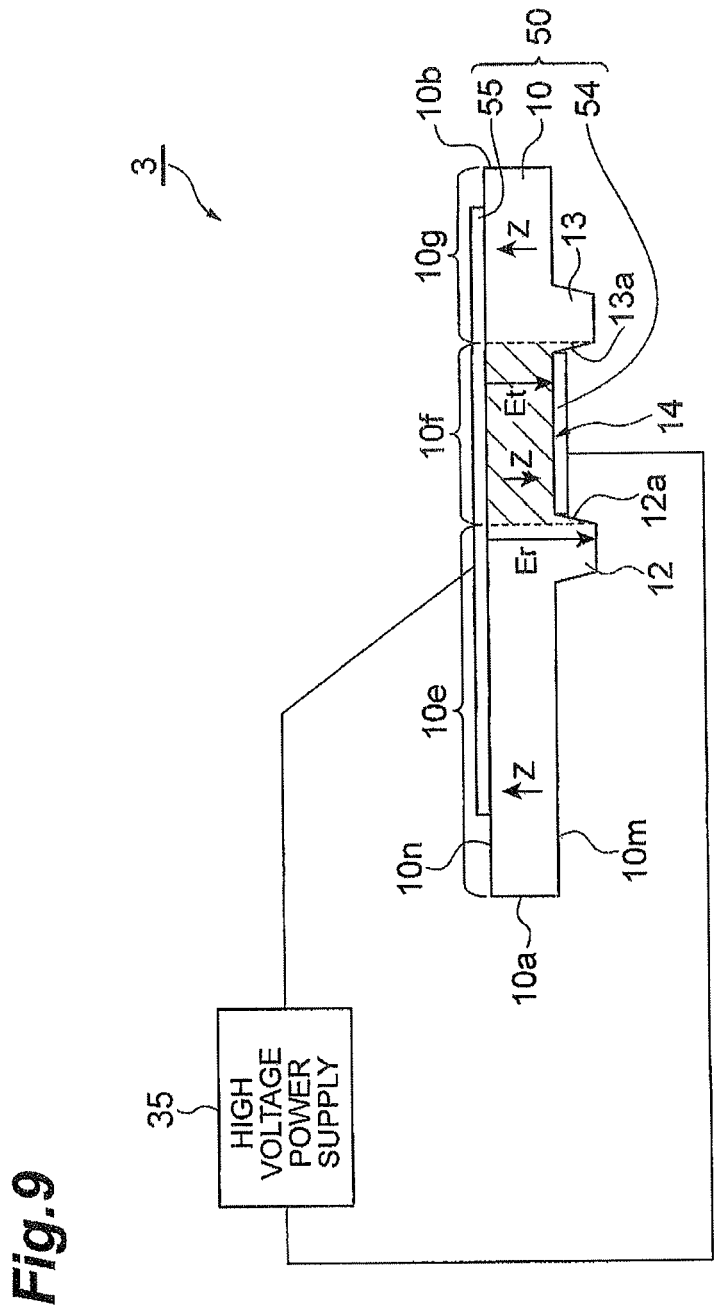
FIG. 9 is a view schematically illustrating a third modification example of the masking method of the substrate in the polarization reversal process apparatus of FIG. 4.

FIG. 9 is a view schematically illustrating a third modification example of the masking method of the substrate 10 in the polarization reversal process apparatus 3. As illustrated in FIG. 9, the polarization reversal process apparatus 3 is different from the polarization reversal process apparatus 3 in FIGS. 5, 7, and 8 in that the polarization reversal process apparatus 3 does not include the holding parts 31, the sealing parts 32, the liquid electrode 33, and the liquid electrode 34. The substrate 50 is different from the substrate 50 in FIG. 5 in that the substrate 50 includes a metal film 54 and a metal film 55 in place of the mask layer 51. That is, in the substrate 50 in FIG. 9, the metal film 54 is provided on a part sandwiched by the ridge part 12 and the ridge part 13 on the principal plane 10m of the substrate 10 and the metal film 55 is provided so as to cover a part opposite to the metal film 54 in the back surface 10n of the substrate 10. The metal film 54 and the metal film 55 are conductive and are made of, for example, Cr, Al, Au, or the like. The metal film 54 and the metal film 55 can be formed using, for example, a liftoff method.

In this polarization reversal process apparatus 3 as well, similar to the polarization reversal process apparatus 3 in FIG. 5, it is possible to reverse the polarization direction of a desired region in the substrate 10. In addition, it is possible to improve the uniformity of the electric field being applied using the metal film 54 and the metal film 55. In addition, since the fluid leaking and the like of the liquid electrode 33 and the liquid electrode 34 do not occur, it becomes possible to simply reverse polarization.

Fourth Modification Example

Figure 10:
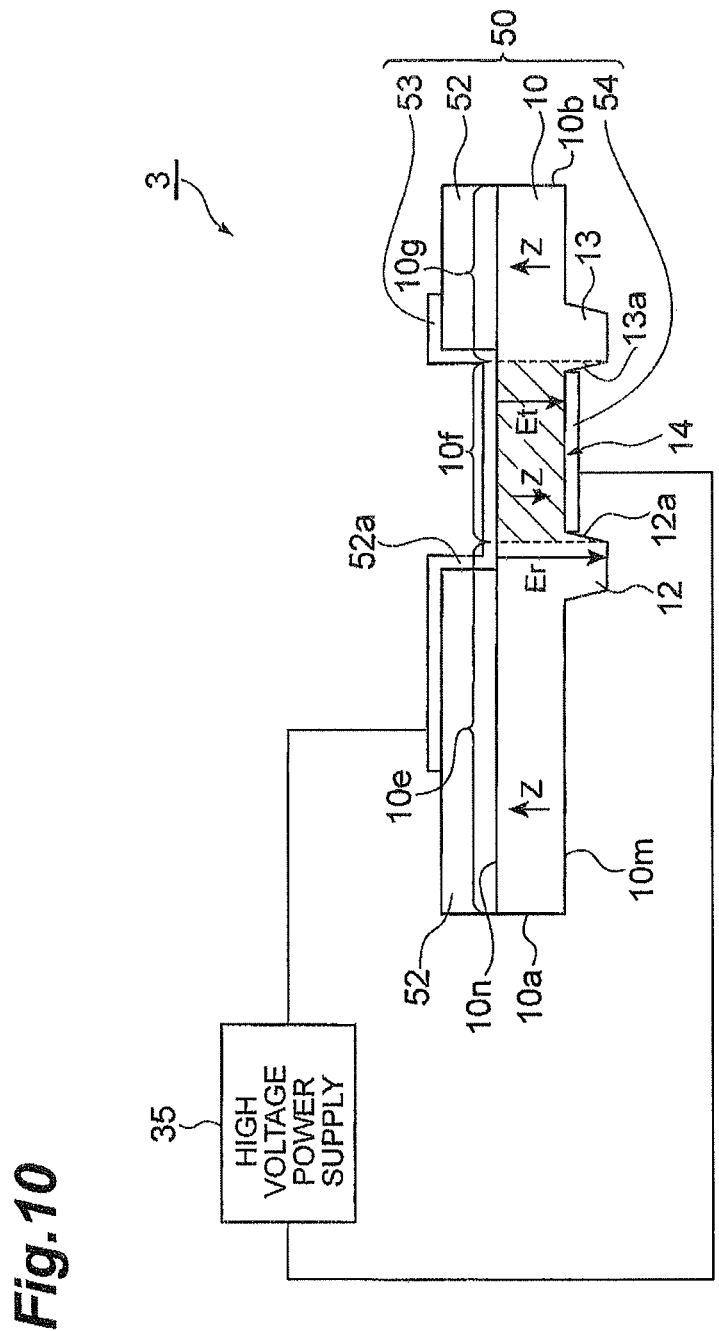
FIG. 10 is a view schematically illustrating a fourth modification example of the masking method of the substrate in the polarization reversal process apparatus of FIG. 4.

FIG. 10 is a view schematically illustrating a fourth modification example of the masking method of the substrate 10 in the polarization reversal process apparatus 3. As illustrated in FIG. 10, the polarization reversal process apparatus 3 is different from the polarization reversal process apparatus 3 in FIGS. 5, 7, and 8 in that the polarization reversal process apparatus 3 does not include the holding parts 31, the sealing parts 32, the liquid electrode 33, and the liquid electrode 34. The substrate 50 is different from the substrate 50 in FIG. 8 in that the substrate further includes the metal film 54.

In this polarization reversal process apparatus 3 as well, similar to the polarization reversal process apparatus 3 in FIG. 5, it is possible to reverse the polarization direction of a desired region in the substrate 10. In addition, since the fluid leaking and the like of the liquid electrode 33 and the liquid electrode 34 do not occur, it becomes possible to simply reverse polarization.

REFERENCE SIGNS LIST

1 OPTICAL WAVEGUIDE ELEMENT
10 SUBSTRATE
10e FIRST REGION
10f SECOND REGION
11 RIDGE PART (FIRST RIDGE PART)
12 RIDGE PART (SECOND RIDGE PART)
13 RIDGE PART (THIRD RIDGE PART)
33, 34 LIQUID ELECTRODE
11a OPTICAL WAVEGUIDE
A DIRECTION (FIRST DIRECTION)
D1 DOMAIN WALL (BOUNDARY)
Ec COERCIVE ELECTRIC FIELD

The invention claimed is:
1. A method for manufacturing an optical waveguide element, comprising:
an optical waveguide forming step of forming an optical waveguide extending in a first direction in a substrate by doping the substrate with an impurity for reducing a coercive electric field of the substrate;
a ridge forming step of forming a first ridge part including the optical waveguide and a second ridge part intersecting the first ridge part; and
a poling step of reversing a polarization direction of a region of the substrate divided by the second ridge part by applying voltage to the region.
2. The method for manufacturing an optical waveguide element according to claim 1,
wherein, in the ridge forming step, the second ridge part is formed so that a height of the second ridge part becomes greater than flatness of the substrate.
3. The method for manufacturing an optical waveguide element according to claim 1,
wherein, in the poling step, voltage is applied to the region using a liquid electrode.
4. The method for manufacturing an optical waveguide element according to claim 1,
wherein, in the ridge forming step, a third ridge part intersecting the first ridge part is further formed, and in the poling step, the polarization direction of a region sandwiched by the second ridge part and the third ridge part in the substrate is reversed by applying voltage to the region.

5. An optical waveguide element comprising:
a substrate including a first ridge part extending in a first direction and a second ridge part intersecting the first ridge part,
wherein the first ridge part includes an optical waveguide extending in the first direction,
the optical waveguide includes an impurity for reducing a coercive electric field of the substrate,
the substrate includes a first region and a second region disposed in line in the first direction,
a polarization direction of the first region is opposite to a polarization direction of the second region, and
the second ridge part is provided on a boundary between the first region and the second region.

6. The optical waveguide element according to claim 5, wherein height of the second ridge part is greater than flatness of the substrate.

\* \* \* \* \*